United States Patent
Jiang et al.

(10) Patent No.: US 9,305,361 B2
(45) Date of Patent: Apr. 5, 2016

(54) RESOLVING HOMOGRAPHY DECOMPOSITION AMBIGUITY BASED ON ORIENTATION SENSORS

(75) Inventors: Bolan Jiang, San Diego, CA (US); Dheeraj Ahuja, San Diego, CA (US); Christopher Brunner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 13/310,204

(22) Filed: Dec. 2, 2011

(65) Prior Publication Data

US 2013/0063589 A1    Mar. 14, 2013

Related U.S. Application Data

(60) Provisional application No. 61/533,733, filed on Sep. 12, 2011.

(51) Int. Cl.

| | |
|---|---|
| *G01B 11/03* | (2006.01) |
| *G01B 11/26* | (2006.01) |
| *G06T 7/20* | (2006.01) |
| *G01B 11/02* | (2006.01) |

(52) U.S. Cl.
CPC .............. *G06T 7/20* (2013.01); *G06T 7/2033* (2013.01); *G01B 11/022* (2013.01); *G06T 2207/10016* (2013.01); *G06T 2207/30244* (2013.01)

(58) Field of Classification Search
CPC ............ G06T 7/20; G06T 7/2033; G06T 2207/30244; G06T 2207/10016; G01B 11/022; G01B 11/024; G01B 7/18; G01B 7/181; G01C 15/00
See application file for complete search history.

(56) References Cited

U.S. PATENT DOCUMENTS

| | | | |
|---|---|---|---|
| 6,520,647 | B2 | 2/2003 | Raskar |
| 7,242,818 | B2 | 7/2007 | Beardsley et al. |
| 7,403,658 | B2 | 7/2008 | Lin et al. |
| 7,613,361 | B2 | 11/2009 | Anabuki et al. |
| 7,698,094 | B2 | 4/2010 | Aratani et al. |

(Continued)

FOREIGN PATENT DOCUMENTS

| | | |
|---|---|---|
| CN | 1745397 A | 3/2006 |
| EP | 1978731 A2 | 10/2008 |

(Continued)

OTHER PUBLICATIONS

Faugeras et al. ("Motion and Structure from Motion in a Peicewise Planar Environment") Jun. 1988.*

(Continued)

*Primary Examiner* — Mohammed Jebari
(74) *Attorney, Agent, or Firm* — Silicon Valley Patent Group LLP

(57) ABSTRACT

A homography between two captured images of a planar object is decomposed into at least one possible solution, and typically at least two ambiguous solutions. The ambiguity between the two solutions is removed, or a single solution validated, using measurements from orientation sensors. The measurements from orientation sensors may be used by comparing at least one of the yaw, pitch, and/or roll angles derived from a relative rotation matrix for the one or more solutions to a corresponding at least one of the yaw, pitch, and/or roll angles derived from the measurements from the orientation sensors.

24 Claims, 5 Drawing Sheets

(56) References Cited

U.S. PATENT DOCUMENTS

| | | | |
|---|---|---|---|
| 7,796,116 B2 | 9/2010 | Salsman et al. | |
| 7,847,844 B2 | 12/2010 | Takemoto et al. | |
| 7,852,317 B2 | 12/2010 | Grunnet-Jepsen et al. | |
| 7,965,904 B2 | 6/2011 | Kobayashi | |
| 8,155,787 B2 | 4/2012 | Chalubert et al. | |
| 8,264,553 B2 | 9/2012 | Joshi et al. | |
| 8,638,986 B2 | 1/2014 | Jiang et al. | |
| 2004/0179107 A1* | 9/2004 | Benton | 348/211.99 |
| 2007/0031004 A1 | 2/2007 | Matsui et al. | |
| 2008/0246848 A1 | 10/2008 | Tsubaki et al. | |
| 2010/0045701 A1* | 2/2010 | Scott et al. | 345/633 |
| 2010/0149183 A1 | 6/2010 | Loewke et al. | |
| 2011/0046843 A1* | 2/2011 | Caveney | 701/33 |
| 2012/0038549 A1 | 2/2012 | Mandella et al. | |
| 2012/0062702 A1 | 3/2012 | Jiang et al. | |
| 2012/0147139 A1 | 6/2012 | Li et al. | |
| 2012/0301011 A1 | 11/2012 | Grzechnik | |
| 2013/0044913 A1 | 2/2013 | Jin et al. | |
| 2013/0064421 A1 | 3/2013 | Ahuja | |
| 2014/0086494 A1* | 3/2014 | Benhimane et al. | 382/215 |

FOREIGN PATENT DOCUMENTS

| | | | |
|---|---|---|---|
| JP | 2006513504 A | 4/2006 | |
| JP | 2007164631 A | 6/2007 | |
| JP | 2008259076 A | 10/2008 | |
| WO | 2004066213 A1 | 8/2004 | |
| WO | 2007100303 A1 | 9/2007 | |

OTHER PUBLICATIONS

Brandao A. S. et al., "Decentralized Control of a Formation Involving a Miniature Helicopter and a Team of Ground Robots Based on Artificial Vision", Robotics Symposium and Intelligent Robotic Meeting (LARS), Oct. 23, 2010, pp. 126-131, Latin American, IEEE, XP031885776, DOI: 10.1109/LARS.2010.12, ISBN: 978-1-4244-8639-7.

Dominik A et al., "Towards 1-24 real-time camera egomotion estimation and three-dimensional scene acquisition from monocular image streams", Indoor Positioning and Indoor Navigation (IPIN), 2010 International Conference on, IEEE, Piscataway, NJ, USA, Sep. 15, 2010, pp. 1-10, XP031810309.

International Search Report and Written Opinion—PCT/US2012/050963—ISA/EPO—Oct. 26, 2012.

Kumar S. D. et al., "Robust Homography-Based Control for Camera Positioning in Piecewise Planar Environments", Jan. 1, 2007, Computer Vision, Graphics and Image Processing Lecture Notes in Computer Science, LNCS, p. 906-918, Springer, Berlin, DE, XP019053082, ISBN: 978-3-540-68301-8.

Oreifej. O et al., "Horizon constraint for unambiguous UAV navigation in planar scenes", IEEE International Conference on Robotics and Automation (ICRA), May 9, 2011, pp. 1159-1165, IEEE, XP032033463, DOI: 10.1109/ICRA.2011.5979586, ISBN: 978-1-61284-386-5.

Brown, et al., "Minimal Solutions for Panoramic Stitching", IEEE Conference on Computer Vision and Pattern Recognition; 2007, 8pgs.

Okaya T, "Estimating camera translation based on a voting method using a camera with a 3D orientation sensor", IPSJ SIG Notes, Japan, Information Processing Society of Japan, Sep. 14, 2001, vol. 2001, No. 87, pp. 25-32.

Klein G., et al., "Parallel Tracking and Mapping on a Camera Phone", Mixed and Augmented Reality 2009, ISMAR 2009, 8th IEEE International Symposium on IEEE, Piscataway, NJ, USA, Oct. 19, 2009, pp. 83-86.

Okatani T., et al., "Robust estimation of camera translation between two images using a camera with a 3D orientation sensor", Pattern Recognition, 2002. Proceedings. 16th International Conference on Quebec City, Que., Canada Aug. 11-15, 2002, Los Alamitos, CA, USA, IEEE Comput. Soc, US, vol. 1, Aug. 11, 2002, pp. 275-278.

Yu G, "Research on Several Problems of Vision-based Navigation and Control for Aerial Robotics," Chinese Doctoral Dissertations Full-text Database Information Science and Technology, Dec. 15, 2010, 7 pages.

* cited by examiner

RESOLVING HOMOGRAPHY DECOMPOSITION AMBIGUITY BASED ON ORIENTATION SENSORS

CROSS-REFERENCE TO PENDING PROVISIONAL APPLICATION

This application claims priority under 35 USC 119 to U.S. Provisional Application No. 61/533,733, filed Sep. 12, 2011, and entitled "Resolving Homography Decomposition Ambiguity," which is assigned to the assignee hereof and which is incorporated herein by reference.

BACKGROUND

Vision based tracking techniques use images captured by a mobile platform to determine the position and orientation (pose) of the mobile platform with respect to an object in the environment. Tracking is useful for many applications such as navigation and augmented reality, in which virtual objects are inserted into a user's view of the real world.

One type of vision based tracking initializes a reference patch by detecting a planar surface in the environment. The surface is typically detected using multiple images of the surface the homography between the two images is computed and used to estimate 3D locations for the points detected on the surface. Any two camera images of the same planar surface are related by a 3×3 homography matrix h. The homography h can be decomposed into rotation R and translation t between two images. The pose information [R|t] may then be used for navigation, augmented reality or other such applications.

However, in most cases, the decomposition of homography h yields multiple possible solutions. Only one of these solutions, however, represents the actual planar surface. Thus, there is an ambiguity in the decomposition of homography h that must be resolved. Known methods of resolving homography decomposition ambiguity require the use of extra information to select the correct solution, such as additional images or prior knowledge of the planar surface.

By way of example, tracking technologies such as that described by Georg Klein and David Murray, "Parallel Tracking and Mapping on a Camera Phone", In Proc. International Symposium on Mixed and Augmented Reality (ISMAR), 4 pages, 2009 ("PTAM"), suffers from the ambiguity in the pose selection after homography decomposition. PTAM requires additional video frames, i.e., images, to resolve the ambiguity. For each possible solution, PTAM computes the 3D camera pose and compares the pose reprojection error for a number of subsequent frames. When the average projection error for one solution is greater than another, such as two times greater, the solution with the greater error is eliminated. Using pose reprojection to resolve the ambiguity, however, takes a long time to converge and sometimes yields incorrect results.

Another approach used to resolve the ambiguity is to choose the homography solution with normal closest to the initial orientation of the camera. This approach, however, restricts the user to always begin close to a head-on orientation and move camera away from that position.

In an approach described by D. Santosh Kumar and C. V. Jawahar, "Robust Homography-Based Control for Camera Positioning in Piecewise Planar Environments", Indian Conference on Computer Vision, Graphics and Image Processing (ICVGIP), 906-918 (2006), another planar surface in space is required or prior knowledge about the plane is needed to select the correct solution. Thus, this approach has limited practical application.

SUMMARY

A homography between two captured images of a planar object is decomposed into at least one possible solution, and typically at least two ambiguous solutions. The ambiguity between the two solutions is removed, or a single solution validated, using measurements from orientation sensors. The measurements from orientation sensors may be used by comparing at least one of the yaw, pitch, and/or roll angles derived from a relative rotation matrix for the one or more solutions to a corresponding at least one of the yaw, pitch, and/or roll angles derived from the measurements from the orientation sensors.

In one embodiment, a method includes capturing two images of a planar object from different positions; determining a homography between the two images; decomposing the homography to obtain at least one possible solution; using measurements from orientation sensors to determine if the at least one possible solution is correct; and storing a correct solution.

In another embodiment, an apparatus includes a camera for capturing images of a planar object; orientation sensors for sensing an orientation of the camera; and a processor coupled to receive two images of the planar object from different positions and measurements from the orientation sensors when the two images are captured, the processor configured to determine a homography between the two images, decompose the homography to obtain at least one possible solution, use the measurements from the orientation sensors to determine if the at least one possible solution is correct, and store a correct solution in a memory.

In another embodiment, an apparatus includes means for capturing two images of a planar object from different positions; means for determining a homography between the two images; means for decomposing the homography to obtain at least one possible solution; means for using measurements from orientation sensors to determine if the at least one possible solution is correct; and means for storing a correct solution.

In yet another embodiment, a non-transitory computer-readable medium including program code stored thereon includes program code to determine a homography between two images of a planar object captured from different positions; program code to decompose the homography to obtain at least one possible solution; program code to use measurements from orientation sensors to determine if the at least one possible solution is correct; and program code to store a correct solution.

DETAILED DESCRIPTION

Figure 1:
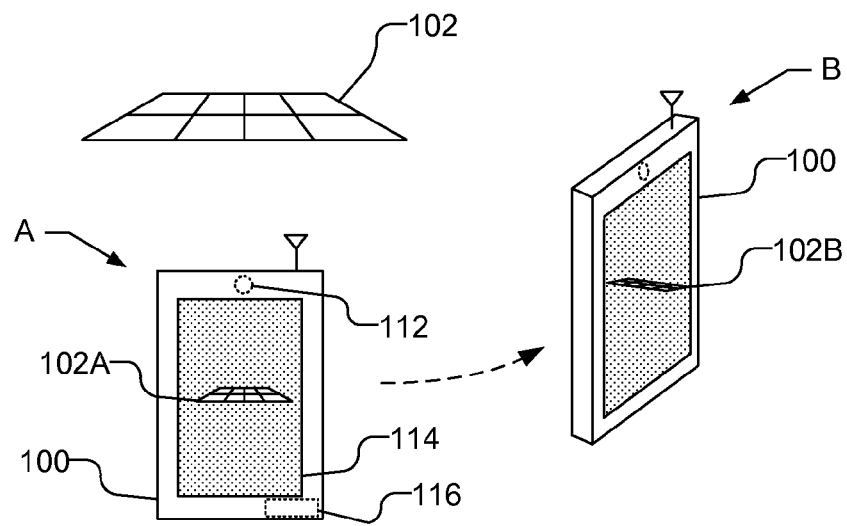
FIG. 1 illustrates a mobile platform capturing images of a planar object at two different positions.

FIG. 1 illustrates a mobile platform 100 including a camera 112 and capturing an image of a planar object 102 with the camera 112 at two different positions A and B, where position A corresponds to the first (or initial) captured image 102A and position B corresponds to the second (or current) captured image 102B. The captured images 102A and 102B are illustrated as being shown by display 114. In practice, a single mobile platform 100 may capture a series of frames from a live video stream while it is moved from position A to position B, as indicated by the broken arrow in FIG. 1. Alternatively, two different mobile platforms may be used to capture images of planar object 102 from the different positions A and B. The mobile platform 100 also includes orientation sensors 116, such as accelerometers, magnetometers, and/or gyroscopes. It is noted that while sensors such as accelerometers measure linear motion and sensors such as gyroscopes measure angular motion, the relative orientation between two positions may be determined using such sensors and accordingly, all such sensors are referred to herein as orientation sensors 116.

Figure 2:
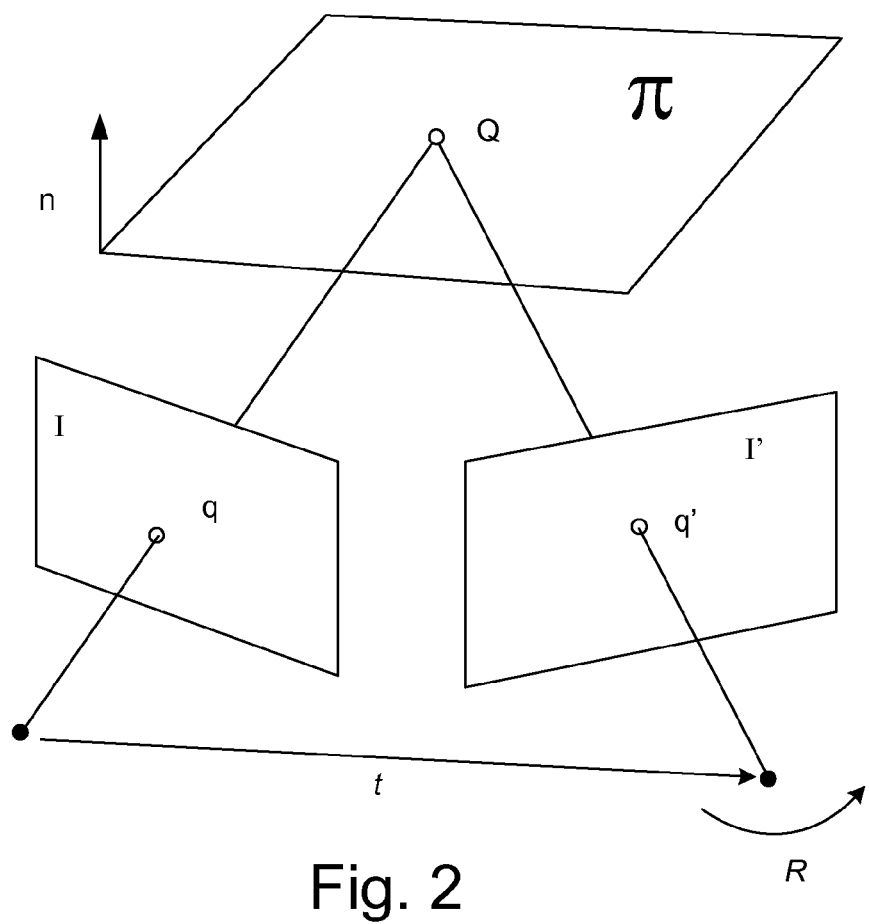
FIG. 2 illustrates the projection of a three-dimensional (3D) point on a planar object onto two images captured at different positions.

As shown in FIG. 2, if a 3D point on a plane π is viewed on two images I' and I, its 2D projection q'=(x',y',1) on image I' and q=(x,y,1) on image I are related by a homography h as:

$$q' \cong hq \qquad \text{eq. 1}$$

The homography h between two views of a planar surface can be decomposed into the rotation matrix R, translation matrix t and the normal n using a well-known procedure described in Faugeras, O., Lustman, F.: "Motion and structure from motion in a piecewise planar environment", International Journal of Pattern Recognition and Artificial Intelligence 2 (1988) 485-508, which is incorporated herein by reference. In most general cases, the decomposition of homography h generates four possible solutions, i.e., four possible sets of rotation matrices R and translation matrices t. Two solutions could be eliminated by enforcing non-crossing constraints and visibility constraints. The non-crossing constraint requires that the two camera images are captured from the same side of the planar object, e.g., both images are captured from above the planar object. The visibility constraint requires that all the 3D points on the planar object must be in front of the camera when the images are captured. However, the ambiguity between the other two possible solutions remains.

Figure 3:
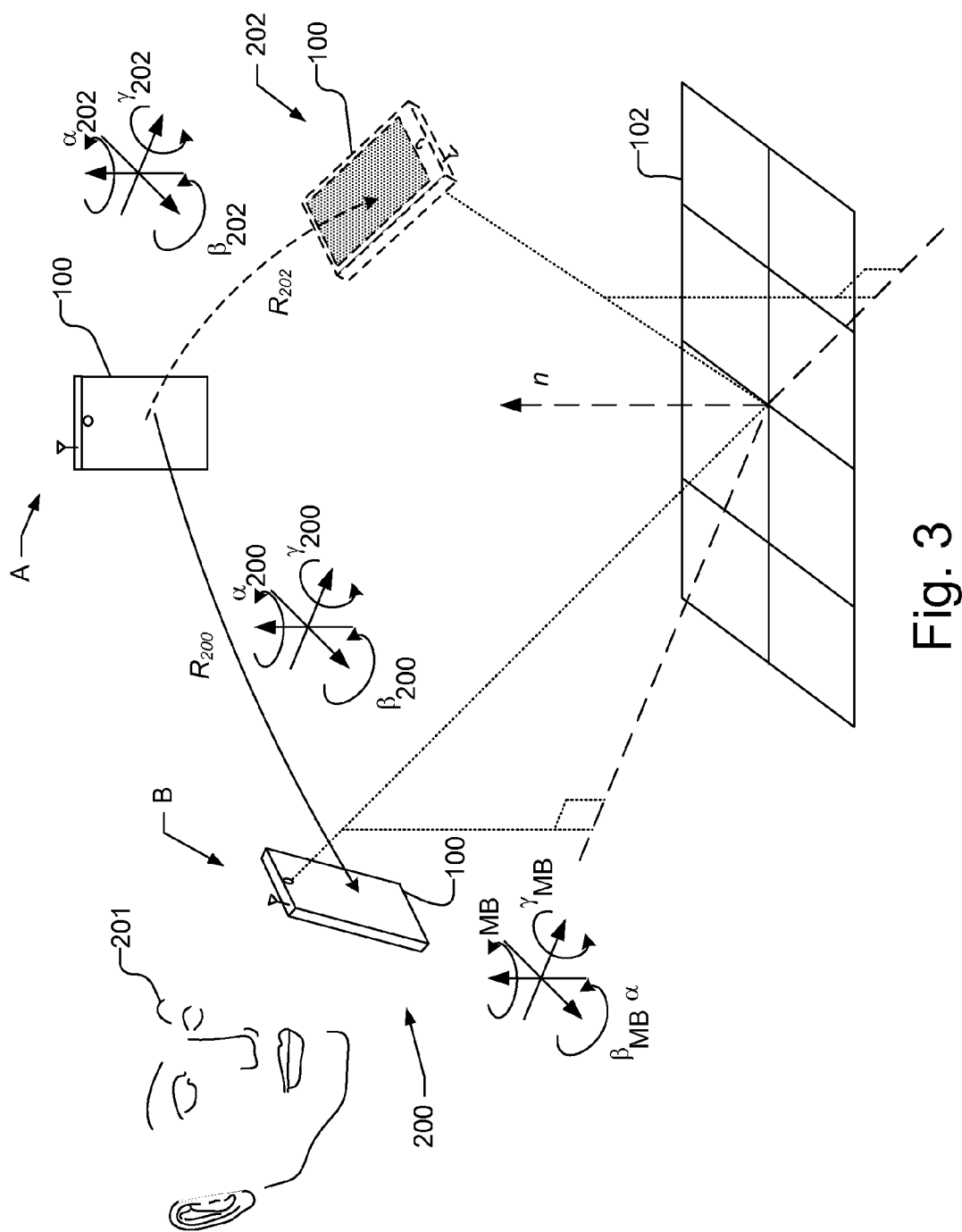
FIG. 3 illustrates ambiguity in solutions to homography decomposition.

FIG. 3 is another illustration of the mobile platform 100 at the initial position A and at the current position B (along with user 201) with respect to the planar object 102. The homography decomposition from the images produced at the initial position A and the current position B produces two possible solutions 200 and 202, wherein solution 200 corresponds to the correct position B of the mobile platform 100 and solution 202 is incorrect and is illustrated with dotted lines. As discussed above, each solution 200 and 202 to the homography decomposition includes the plane normal n, shown in FIG. 3, as well as a rotation matrix R, illustrated by arrows $R_{200}$ and $R_{202}$ in FIG. 3, and translation matrix t, not shown in FIG. 3. It should be understood, as discussed above, that the homography decomposition may produce up to four possible solutions, but two solutions may be easily eliminated by enforcing non-crossing constraints and visibility constraints and are therefore not shown FIG. 3. The two remaining possible solutions 200 and 202 shown in FIG. 3 are both valid solution from the homography decomposition, and thus, it is desirable to resolve the ambiguity. Additionally, it should be understood that the homography decomposition may produce only one possible solution, e.g., solution 200, but it may be desirable to validate that solution.

The ambiguity between the two remaining solutions may be resolved (or validation if there is only one solution) using measurements from the orientation sensors 116 to eliminate a possible solution. The measurements from the orientation sensors 116 may be used to derive measurement based yaw ($\alpha_{MB}$), pitch ($\beta_{MB}$), and roll ($\gamma_{MB}$) angles in the camera coordinate system (sometimes collectively referred to herein as measurement based angles). Similarly, the relative rotation matrices $R_{200}$ and $R_{202}$ associated with the possible solutions 200 and 202 from the decomposition of homography h may be used to derive yaw, pitch, and roll angles (sometimes collectively referred to herein as homography based angles). In other words, as illustrated in FIG. 3, the yaw ($\alpha_{200}$), pitch ($\beta_{200}$), and roll ($\gamma_{200}$) angles may be derived from the rotation matrix $R_{200}$ and the yaw ($\alpha_{202}$), pitch ($\beta_{202}$, and roll ($\gamma_{202}$) angles may be derived from the rotation matrix $R_{202}$. One or more of the measurement based angles may then be compared to the corresponding one or more angles associated with the possible solutions to determine which solution is correct (or to validate a solution if only one solution is present).

The orientation sensors 116 measure a rotation matrix $R_t^{ws}$ that transforms a vector from the sensor coordinate system to the world coordinate system at time t. Additionally, at time t, the rotation matrix $R_t^{wc}$ transforms a vector from the camera coordinate system to the world coordinate system. The relationship between the matrices $R_t^{ws}$ and $R_t^{wc}$ is defined as:

$$R_t^{wc} = R_t^{ws} R^{sc} \qquad \text{eq. 2}$$

where $R^{sc}$ is a rotation matrix that transforms a vector from the camera coordinate system to the sensor coordinate sensor, which is a known constant, e.g., it may be pre-calibrated for the mobile platform 100.

Figure 4:
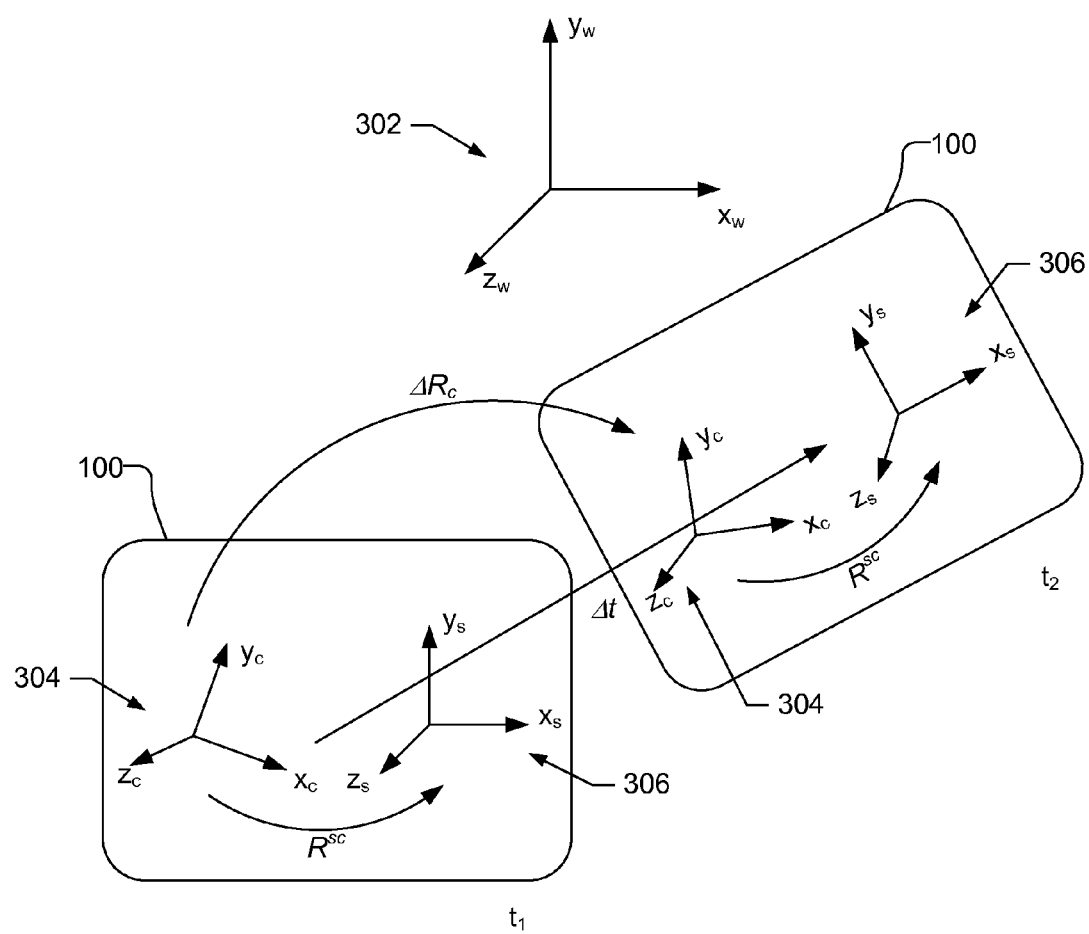
FIG. 4 illustrates the different coordinate systems with respect to mobile platform, including a world coordinate system, a camera coordinate system, and a sensor coordinate system.

FIG. 4, by way of example, illustrates the different coordinate systems with respect to mobile platform 100 at two different positions at time $t_1$ and time $t_2$. The coordinate systems include a world coordinate system 302, as well as a camera coordinate system 304 and a sensor coordinate system 306. As illustrated by an arrow, the rotation matrix $R^{sc}$ transforms a vector from the camera coordinate system 304 to the sensor coordinate system 306 and it remains constant for the mobile platform 100.

If two camera images of the same planar object are captured from different positions, e.g., at time $t_1$ and time $t_2$ shown in FIG. 4, the two images are related by a 3×3 homography matrix h in the camera coordinate system. The homography matrix h can be decomposed into the plane normal n, a relative rotation matrix $\Delta R_c$, illustrated in FIG. 4 with an arrow between the mobile platform 100 at time $t_1$ and time $t_2$, and a translation matrix $\Delta t$. As discussed above, the decomposition of homography h generally yields multiple solutions and, accordingly, the relative rotation matrix $\Delta R_c$, in FIG. 4 corresponds to the relative rotation matrices $R_{200}$ and $R_{202}$ associated with the possible solutions 200 and 202 in FIG. 3.

The relative rotation matrix $\Delta R_c$ between the two images captured at time $t_1$ and time $t_2$ may be determined based on the rotation matrix $R_t^{wc}$ that transforms a vector from the camera coordinate system 304 to the world coordinate system 302 as:

$$\Delta R_c = R_2^{wc-1} R_1^{wc}. \quad \text{eq. 3}$$

By substituting equation 2 into equation 3, the rotation matrix $R_t^{wc}$ may be replaced with the rotation matrix $R_t^{ws}$ (which is measured by the orientation sensors 116) that transforms a vector from the sensor coordinate system 306 to the world coordinate system 302, along with the known constant rotation matrix $R^{sc}$, as follows:

$$\Delta R_c = R^{sc-1} R_2^{ws-1} R_1^{ws} R_{sc}. \quad \text{eq. 4}$$

Thus, using equation 4, measurements from orientation sensors 116 at time $t_1$ and time $t_2$ (i.e., rotation matrix $R_1^{ws}$ measured at time $t_1$ and rotation matrix $R_2^{ws}$ measured at time $t_2$ (which is inverted to $R_2^{ws-1}$)) and the known rotation matrix $R^{sc}$ may be used to compute a measurement based relative rotation matrix $\Delta R_{c\text{-}MB}$. The measurement based relative rotation matrix $\Delta R_{c\text{-}MB}$, which is in the camera coordinate system, corresponds to corresponds to the relative rotation matrix $R_{MB}$ associated with the change from position A to position B in FIG. 3. The measurement based relative rotation matrix $\Delta R_{c\text{-}MB}$ can then be used to select the correct solution for the homography decomposition h, e.g., by deriving the measurement based angles from the measurement based relative rotation matrix $\Delta R_{c\text{-}MB}$ and deriving the homography based angels from the relative rotation matrix $\Delta R_c$ associated with each solution and comparing one or more of the angles to find a closest match or a difference that is within a threshold, which may be determined to be the correction solution.

Where there is only one possible solution generated from homography decomposition, the solution may be incorrect due to poor correlation of the 2D points. In this case, the same process may be used to validate the one solution, i.e., one or more of the measurement based angles are compared to the homography based angles for the one solution to determine if the difference(s) is/are within a threshold. If the threshold is not met, the solution fails, and the process may be reset rather than assuming the only solution is correct.

Figure 5:
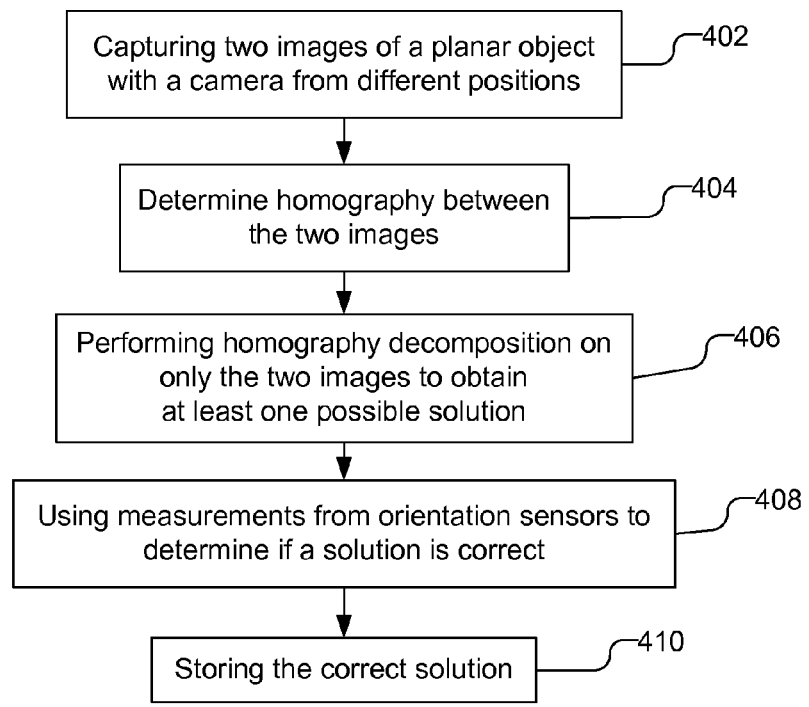
FIG. 5 is a flow chart illustrating the process of resolving ambiguity in the homography decomposition using measurement from orientation sensors.

FIG. 5 is a flow chart illustrating the process of resolving ambiguity in the homography decomposition using measurement from orientation sensors 116. As illustrated, two images of a planar object are captured by a camera (or different cameras) from different positions (402). If two different cameras are used, the measurement of the orientations should be relative to the same world coordinates. For example, X may be defined as the vector product Y·Z and is tangential to the ground at the device's current location and roughly points East); Y is tangential to the ground at the device's current location and points towards the magnetic North Pole; and Z points upwards and is perpendicular to the ground. The homography h is determined between the two images of the planar object (404). Homography decomposition is performed on the two images to obtain at least one possible solution (406). For example, only one possible solution may be obtained, which may be validated using the measurements from the orientation sensors 116. Typically, however, a number of possible solutions may be obtained, a portion of which may be eliminated using non-crossing constraints and visibility constraints, leaving two ambiguous possible solutions. The measurements from orientation sensors 116 are used to determine if a solution is correct (408) and the correct solution is stored as the position and orientation of the camera (410).

Figure 6:
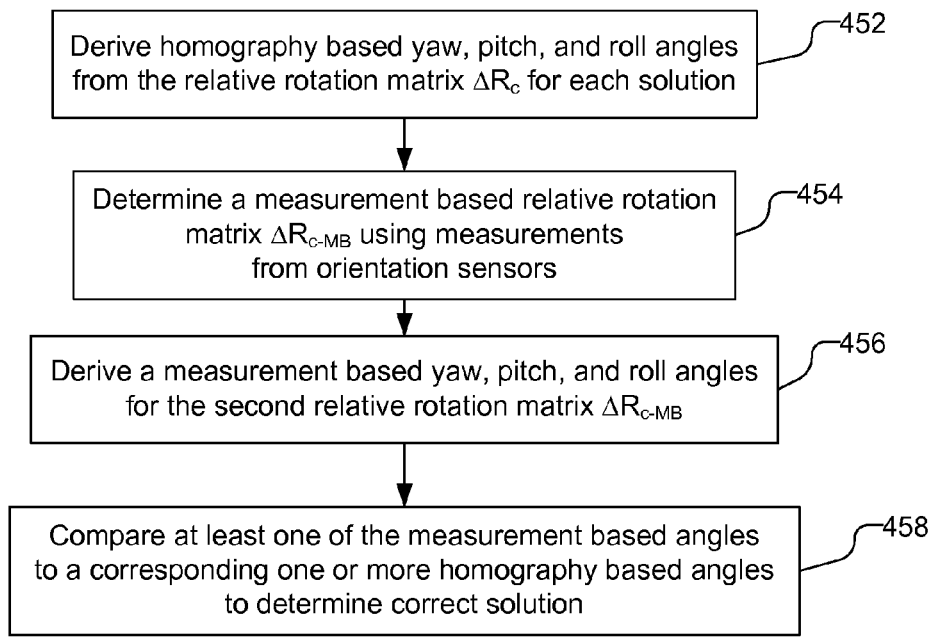
FIG. 6 is a flow chart illustrating the process of using measurements from orientation sensors to eliminate at least one possible solution.

FIG. 6 is a flow chart illustrating the process of using measurements from orientation sensors 116 to determine if a solution is correct (408). During the decomposition of the homography h in step 506 of FIG. 5, a relative rotation matrix $\Delta R_c$ is produced for each solution. Typically, up to four possible solutions are obtained, a portion of which may be eliminated using non-crossing constraints and visibility constraints, leaving two ambiguous possible solutions. Thus, the remaining process is described assuming there are two solutions, but the same process may be performed to verify a single solution. As illustrated in FIG. 4, the homography based angles, i.e., yaw, pitch and roll angles, are derived from the relative rotation matrix $\Delta R_c$ for each solution (452). Deriving yaw, pitch, and roll angles from rotation matrices is well understood to those of ordinary skill in the art. A measurement based relative rotation matrix $\Delta R_{c\text{-}MB}$ is determined using the measurements from the orientation sensors 116, as shown in equation 4 (454). Measurement based angles, i.e., yaw, pitch, and roll, angles, are then derived from the measurement based relative rotation matrix $\Delta R_{c\text{-}MB}$ (456). One or more of the measurement based angles are compared a corresponding one or more homography based angles for each solution to determine the correct solution. For example, the solution having an angle with the smallest difference with respect to a corresponding measurement based angle (or the smallest average difference if more than one angle is used) may be selected as the correct solution. Alternatively, the difference between the one or more measurement based angles and homography based angles may be compared to a threshold to select the correct solution, or to validate when there is only a single solution.

If desired, fewer than all three of the yaw, pitch and roll angles may be used for the comparison. For example, when there are two possible solutions, the homography based angle, i.e., yaw, pitch or roll, with the largest difference between the two solutions may be selected to be compared to a corresponding measurement based angle. Moreover, it should be noted that the yaw angle is more easily affected by magnetic anomalies and, accordingly, it may be desirable to exclude the yaw angle from comparisons so that the correct solution is based on one or both of the roll and pitch angles.

Figure 7:
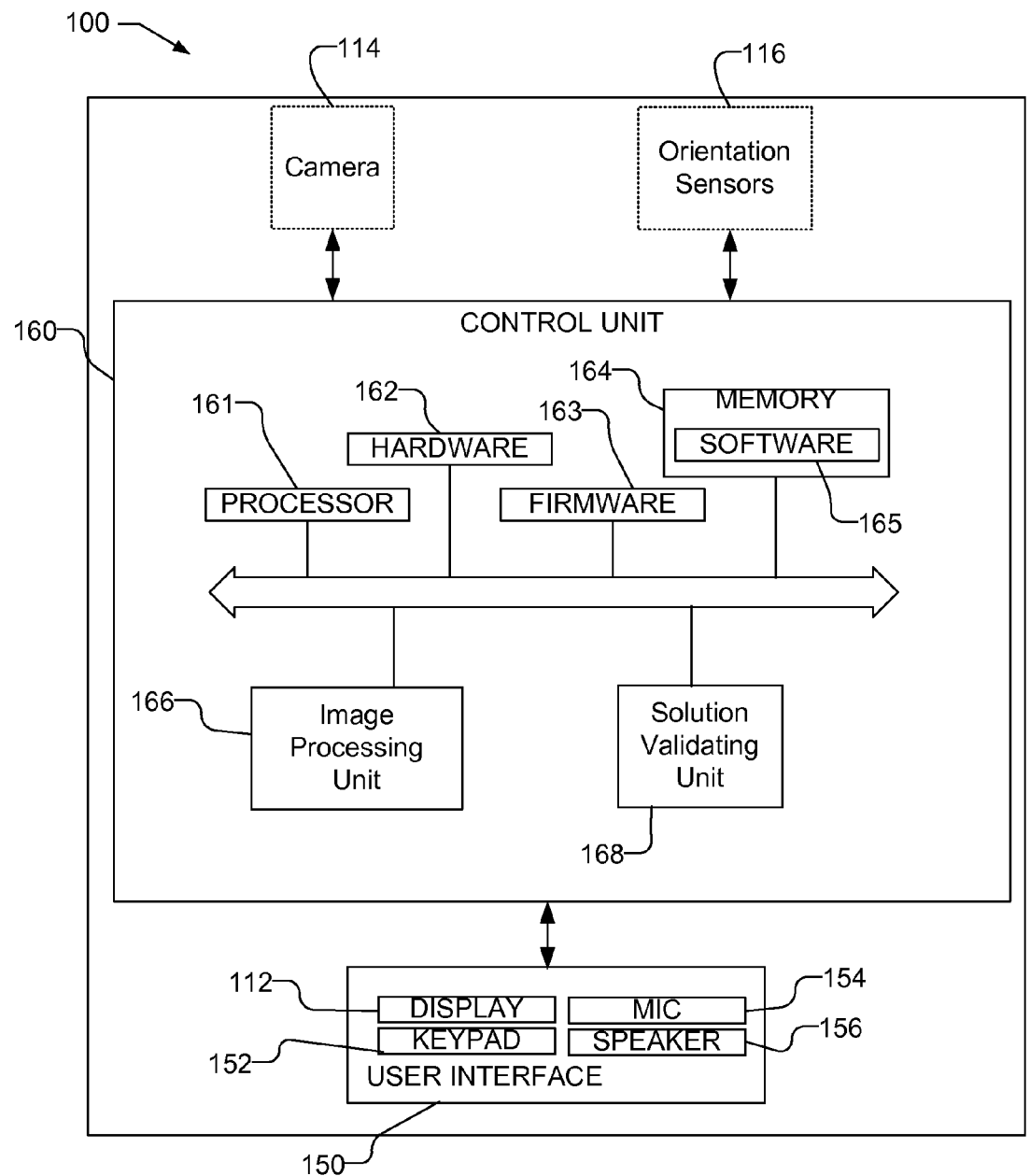
FIG. 7 is a block diagram of a mobile platform capable of resolving ambiguity in the homography decomposition using only two images of the planar object and without any prior knowledge of the planar object.

FIG. 7 is a block diagram of a mobile platform capable of resolving ambiguity in the homography decomposition using only two images of the planar object and without any prior knowledge of the planar object. The mobile platform 100 includes a means for capturing images of a planar object, such as camera 112 or multiple cameras. The mobile platform 100 also includes a means for sensing orientation, such as orientation sensors 116, which may be accelerometers, gyroscopes, electronic compass, or other similar sensing elements. The mobile platform 100 may further include a user interface 150 that includes a means for displaying the image of the environment, such as the display 114. The user interface 150 may also include a keypad 152 or other input device through which the user can input information into the mobile platform 100. If desired, the keypad 152 may be obviated by integrating a virtual keypad into the display 114 with a touch sensor (or gesture control). The user interface 150 may also include a microphone 154 and speaker 156, e.g., if the mobile platform 100 is a mobile platform such as a cellular telephone. Of course, mobile platform 100 may include other elements unrelated to the present disclosure.

The mobile platform 100 also includes a control unit 160 that is connected to and communicates with the camera 112 and orientation sensors 116. The control unit 160 accepts and processes images captured by camera 112 or multiple cameras, signals from the orientation sensors 116 and controls the display 114. The control unit 160 may be provided by a processor 161 and associated memory 164, hardware 162, software 165, and firmware 163. The control unit 160 may include an image processing unit 166 that performs homography decomposition on two images captured by the camera 112. The control unit 160 further includes a solution validating unit 168 that receives the solutions from the homography decomposition and determines if a solution is correct, e.g., based on measurements from the orientation sensors 116 as described in FIGS. 5 and 6. The selected solution may be stored in memory 164 or other storage unit as the position and orientation of the mobile platform 100.

The image processing unit 166 and solution validating unit 168 are illustrated separately from processor 161 for clarity, but may be part of the processor 161 or implemented in the processor based on instructions in the software 165 which is run in the processor 161. It will be understood as used herein that the processor 161 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
capturing two images of a planar object from different positions;
determining a homography between the two images;
decomposing the homography to obtain at least one possible solution, wherein
decomposing the homography produces a relative rotation matrix between the two images for each of the at least one possible solution;
using measurements from orientation sensors to determine if the at least one possible solution is correct, wherein using the measurements from the orientation sensors comprises:
determining a measurement based relative rotation matrix using the measurements from the orientation sensors;
comparing the relative rotation matrix between the two images for each of the least one possible solution to the measurement based relative rotation matrix to determine if the at least one possible solution is correct; and
storing a correct solution.

2. The method of claim 1, wherein a plurality of possible solutions are obtained and the measurements from the orientation sensors are used to eliminate at least one of the plurality of possible solutions.

3. The method of claim 1, wherein using the measurements from the orientation sensors further comprises:
deriving homography based yaw, pitch, and roll angles from the at least one relative rotation matrix;
deriving measurement based yaw, pitch, and roll angles for the measurement based relative rotation matrix; and
comparing at least one of the measurement based yaw, pitch, roll angles, or combination thereof to at least one of the homography based yaw, pitch, roll angles, or combination thereof to determine the at least one possible solution is correct.

4. The method of claim 3, wherein decomposing the homography produces two solutions each having a respective relative rotation matrix and wherein the homography based yaw, pitch, and roll angles are derived for each of the two solutions and wherein the at least one of the measurement based yaw, pitch, roll angles, or combination thereof is compared to the at least one of the homography based yaw, pitch, roll angles, or combination thereof for each of the two solutions.

5. The method of claim 4, further comprising comparing the homography based yaw, pitch, and roll angles for a first solution to the homography based yaw, pitch, and roll angles for a second solution to determine an angle with a largest difference and using only the angle with the largest difference when the at least one of the measurement based yaw, pitch, roll angles, or combination thereof is compared to the at least one of the homography based yaw, pitch, roll angles, or combination thereof for each of the two solutions.

6. The method of claim 1, wherein using the measurements from the orientation sensors to determine if the at least one possible solution is correct does not use prior knowledge of the planar object and does not use additional images of the planar object.

7. An apparatus comprising:
a camera for capturing images of a planar object;
orientation sensors for sensing an orientation of the camera; and
a processor coupled to receive two images of the planar object captured from different positions and measurements from the orientation sensors when the two images are captured, the processor configured to determine a homography between the two images, decompose the homography to obtain at least one possible solution, wherein decomposing the homography produces a relative rotation matrix between the two images for each of the at least one possible solution, use the measurements from the orientation sensors to determine if the at least one possible solution is correct wherein the processor is configured to use the measurements from the orientation sensors to determine if the at least one possible solution is correct by being configured to determine a measurement based relative rotation matrix based on the measurements from the orientation sensors; and compare the relative rotation matrix between the two images for each of the least one possible solution to the measurement based relative rotation matrix to determine if the at least one possible solution is correct; and store a correct solution in a memory.

8. The apparatus of claim 7, wherein a plurality of possible solutions are obtained and the processor is configured to use the measurements from the orientation sensors to eliminate at least one of the plurality of possible solutions.

9. The apparatus of claim 7, wherein the processor is configured to use the measurements from the orientation sensors to determine if the at least one possible solution is correct by being further configured to:
derive homography based yaw, pitch, and roll angles for the at least one relative rotation matrix;
derive a measurement based yaw, pitch, and roll angles for the measurement based relative rotation matrix; and
compare at least one of the measurement based yaw, pitch, roll angles, or combination thereof to at least one of the homography based yaw, pitch, roll angles, or combination thereof to determine if the at least one possible solution is correct.

10. The apparatus of claim 9, wherein decomposing the homography produces two solutions each having a respective relative rotation matrix and wherein the processor is configured to derive the homography based yaw, pitch, and roll angles for each of the two solutions and to compare the at least one of the measurement based yaw, pitch, roll angles, or combination thereof to the at least one of the homography based yaw, pitch, roll angles, or combination thereof for each of the two solutions.

11. The apparatus of claim 10, wherein the processor is further configured to compare the homography based yaw, pitch, and roll angles for a first solution to the homography based yaw, pitch, and roll angles for a second solution to determine an angle with a largest difference and to use only the angle with the largest difference to compare the at least one of the measurement based yaw, pitch, roll angles, or combination thereof to the at least one of the homography based yaw, pitch, roll angles, or combination thereof for each of the two solutions.

12. The apparatus of claim 7, wherein the processor is configured to use the measurements from the orientation sensors to determine if the at least one possible solution without prior knowledge of the planar object and without additional images of the planar object.

13. An apparatus comprising:
means for capturing two images of a planar object from different positions;
means for determining a homography between the two images;
means for decomposing the homography to obtain at least one possible solution, wherein decomposing the homography produces a relative rotation matrix between the two images for each of the at least one possible solution;
means for using measurements from orientation sensors to determine if the at least one possible solution is correct, wherein the means for using the measurements from the orientation sensors comprises:
means for determining a measurement based relative rotation matrix using the measurements from the orientation sensors;
means for comparing the relative rotation matrix between the two images for each of the least one possible solution to the measurement based relative rotation matrix to determine if the at least one possible solution is correct; and
means for storing a correct solution.

14. The apparatus of claim 13, wherein the means for decomposing the homography produces a plurality of possible solutions and wherein the means for using the measurements from the orientation sensors eliminates at least one of the plurality of possible solutions.

15. The apparatus of claim 13, wherein the means for using the measurements from the orientation sensors further comprises:
means for deriving homography based yaw, pitch, and roll angles from the at least one relative rotation matrix;
means for deriving measurement based yaw, pitch, and roll angles for the measurement based relative rotation matrix; and
means for comparing at least one of the measurement based yaw, pitch, roll angles, or combination thereof to at least one of the homography based yaw, pitch, roll angles, or combination thereof to determine the at least one possible solution is correct.

16. The apparatus of claim 15, wherein the means for decomposing the homography produces two solutions each having a respective relative rotation matrix and wherein the homography based yaw, pitch, and roll angles are derived for each of the two solutions and wherein the at least one of the measurement based yaw, pitch, roll angles, or combination thereof is compared to the at least one of the homography based yaw, pitch, roll angles, or combination thereof for each of the two solutions.

17. The apparatus of claim 16, further comprising means for comparing the homography based yaw, pitch, and roll angles for a first solution to the homography based yaw, pitch, and roll angles for a second solution to determine an angle with a largest difference and using only the angle with the largest difference when the at least one of the measurement based yaw, pitch, roll angles, or combination thereof is compared to the at least one of the homography based yaw, pitch, roll angles, or combination thereof for each of the two solutions.

18. The apparatus of claim 13, wherein the means for using the measurements from the orientation sensors to determine if the at least one possible solution is correct does not use prior knowledge of the planar object and does not use additional images of the planar object.

19. A non-transitory computer-readable medium including program code stored thereon, comprising:
program code to determine a homography between two images of a planar object captured from different positions;
program code to decompose the homography to obtain at least one possible solution that produces a relative rotation matrix between the two images for each of the at least one possible solution;
program code to use measurements from orientation sensors to determine if the at least one possible solution is correct, wherein the program code to use the measurements from the orientation sensors comprises:
program code to determine a measurement based relative rotation matrix using the measurements from the orientation sensors;
program code to compare the relative rotation matrix between the two images for each of the least one possible solution to the measurement based relative rotation matrix to determine if the at least one possible solution is correct; and
program code to store a correct solution.

20. The non-transitory computer-readable medium of claim 19, wherein a plurality of possible solutions are obtained and the measurements from the orientation sensors are used to eliminate at least one of the plurality of possible solutions.

21. The non-transitory computer-readable medium of claim 19, wherein the program code to use the measurements from the orientation sensors further comprises:
program code to derive homography based yaw, pitch, and roll angles for the at least one relative rotation matrix;
program code to derive a measurement based yaw, pitch, and roll angles for the measurement based relative rotation matrix; and
program code to compare the at least one of the measurement based yaw, pitch, roll angles, or combination thereof to at least one of the homography based yaw, pitch, roll angles, or combination thereof to determine the at least one possible solution is correct.

22. The non-transitory computer-readable medium of claim 21, wherein the program code to decompose the homography produces two solutions each having a respective relative rotation matrix and wherein the program code derives homography based yaw, pitch, and roll angles for each of the two solutions and wherein the at least one of the measurement based yaw, pitch, roll angles, or combination thereof is compared to the at least one of the homography based yaw, pitch, roll angles, or combination thereof for each of the two solutions.

23. The non-transitory computer-readable medium of claim 22, further comprising program code to compare the homography based yaw, pitch, and roll angles for a first solution to the homography based yaw, pitch, and roll angles for a second solution to determine an angle with a largest difference and the program code to compare uses only the angle with the largest difference when the at least one of the measurement based yaw, pitch, roll angles, or combination thereof to compare to the at least one of the homography based yaw, pitch, roll angles, or combination thereof for each of the two solutions.

24. The non-transitory computer-readable medium of claim 19, wherein the program code to use the measurements from the orientation sensors to determine if the at least one possible solution is correct does not use prior knowledge of the planar object and does not use additional images of the planar object.

* * * * *